United States Patent
Margerm et al.

(10) Patent No.: US 7,051,229 B2
(45) Date of Patent: May 23, 2006

(54) LOGICAL BUS OVERLAY FOR INCREASING THE EXISTING SYSTEM BUS DATA RATE

(75) Inventors: Steven Douglas Margerm, Surrey (CA); Darwin Noel Hawes, Burnaby (CA)

(73) Assignee: Alcatel Canada Inc., Ottawa (CA)

( * ) Notice: Subject to any disclaimer, the term of this patent is extended or adjusted under 35 U.S.C. 154(b) by 496 days.

(21) Appl. No.: 10/308,026

(22) Filed: Dec. 3, 2002

(65) Prior Publication Data

US 2004/0117512 A1    Jun. 17, 2004

(51) Int. Cl.
G06F 1/04 (2006.01)
(52) U.S. Cl. .......... 713/600; 713/500
(58) Field of Classification Search ........ 713/500, 713/600; 710/60, 313
See application file for complete search history.

(56) References Cited

U.S. PATENT DOCUMENTS

| | | | |
|---|---|---|---|
| 5,499,385 A * | 3/1996 | Farmwald et al. ......... 710/3 |
| 5,513,327 A * | 4/1996 | Farmwald et al. ......... 710/305 |
| 5,708,850 A | 1/1998 | Staros ......... 395/868 |
| 5,774,706 A * | 6/1998 | Neal et al. ......... 713/600 |
| 5,793,236 A * | 8/1998 | Kosco ......... 327/218 |
| 5,809,291 A * | 9/1998 | Munoz-Bustamante et al. . 713/501 |
| 5,838,995 A * | 11/1998 | Chen et al. ......... 710/60 |
| 6,049,846 A * | 4/2000 | Farmwald et al. ......... 710/305 |
| 6,185,642 B1 * | 2/2001 | Beukema et al. ......... 710/60 |
| 6,266,731 B1 * | 7/2001 | Riley et al. ......... 710/313 |
| 6,377,912 B1 | 4/2002 | Sample et al. ......... 703/28 |
| 6,378,020 B1 | 4/2002 | Farmwald et al. ......... 710/129 |
| 6,487,620 B1 * | 11/2002 | Grosshog et al. ......... 710/107 |
| 6,795,360 B1 * | 9/2004 | Duh et al. ......... 365/221 |
| 6,859,454 B1 * | 2/2005 | Bowes ......... 370/366 |
| 6,934,789 B1 * | 8/2005 | Peng et al. ......... 710/313 |
| 2002/0038397 A1 | 3/2002 | Singh et al. ......... 710/105 |

* cited by examiner

*Primary Examiner*—Chun Cao
(74) *Attorney, Agent, or Firm*—Jim Zegeer

(57) ABSTRACT

A system and method for increasing the data rate of a system bus without making modifications to existing (legacy) devices connected to the bus. A logical bus is overlaid onto one or more physical buses in a TDM manner. The overlaying is done by transmitting data into the one or more existing buses during a previously unused phase of the bus clock having no effect on existing devices connected to the buses. The additional devices are capable of latching data on either phase bus clock.

7 Claims, 2 Drawing Sheets

LOGICAL BUS OVERLAY FOR INCREASING THE EXISTING SYSTEM BUS DATA RATE

BACKGROUND AND BRIEF DESCRIPTION OF THE INVENTION

The present invention relates to increasing the data rate of a system bus in a switch/router, particularly while supporting legacy cards of a lower data rate.

FIG. 1 (prior art) is a simplified block diagram of the system bus architecture of the 7670 RSP ESE. (The 7670 RSP ESE edge services extender is an integrated multiservice broadband access/routing switch platform marketed by Alcatel Canada Inc., the assignee of the present invention. General information concerning the Alcatel 7670 routing switch platform is disclosed in a section of the 7670 General Information Book copyrighted 2002.). Referring to FIG. 1, the ESE Control Complex (ECC) 10 includes a switching fabric 11 that sends cell traffic via bus drivers 13, 14 to universal card slot (UCS) cards 18-1 . . . 18-6; 19-1 . . . 19-6 (e.g. linecards) over two 32 bit, 25 MHz buses 15, 16, referred to as drop buses. Other buses, not shown, carry cell traffic from the UCS cards 18, 19 to the switching fabric 11. Up to six UCS cards can connect to each drop bus via conventional UCS slots. The control complex 10 includes two rising edge triggered bus drivers 13, 14, which output data on the rising edge of a clock provided by a system clock generator 21. Each bus driver 13, 14 outputs data on a respective one of the drop buses 15, 16.

Patent Prior Art:
1. U.S. Pat. No. 6,378,020 issued to Farmwald et al on Apr. 23, 2002 entitled "System Having Double Data Transfer Rate and Integrated Circuit Therefor."

This patent discloses an output driver circuit that drives first and second portions of data onto a bus on rising and falling edge transitions of an external clock signal, respectively. A clock circuit is required to derive low skew internal clock and inverted clock signals from the external clock signal (see column 4, lines 30–33). The internal clock and inverted block signals define odd and even cycles to which all slave devices (e.g. DRAMs) connected to the bus must be able to respond (see column 8, lines 15–40). This capability requires that new circuitry be added to such prior art slave devices (see column 4, lines 24–29). In effect, the bus rate is simply doubled by using both edges of the bus clock.

2. U.S. Pat. No. 5,708,850 issued to Staros on Jan. 13, 1998 entitled "Parallel Processing System for Time Division Multiplex Data Transfer Including Read/Write Dual Port Memory Accessible to Bus and Digital Signal Processor During Opposite Phases of Clock." This patent discloses a multiprocessor system wherein each processor of the system can transmit data over a system TDM bus according to an identification code assigned to the processor. Internal processor elements, i.e. a DSP and a dual port RAM, access the bus during respective phases of the clock signal during a TDM slot which is determined and in accordance with the identification code of the processor.

3. U.S. Pat. No. 6,377,912 issued to Sample et al on Apr. 23, 2002 entitled "Emulation System with Time-Multiplexed Interconnect." This patent discloses a hardware emulation system in which logic chips are interconnected over shared signal pins and circuit board traces by using TDM multiplexing and demultiplexing chips coupled to a crossbar for TDM switching of signals between the logic chips.

4. U.S. Published patent Application 2002/0038397, inventors Singh et al on Mar. 28, 2002 entitled "Quad Pumped Bus Architecture and Protocol." This disclosure relates to a method of increasing the data rate of a system bus by operating the bus at a rate that is a multiple of the original bus rate. Sampling strobe signals are provided to devices connected to the bus to identify to the device when data destined for the device is available to it.

The problem of the bus architecture of FIG. 1 (prior art) is that the drop buses, for sending cells from the fabric to the UCS cards 18, 19, are too slow compared to the buses for receiving traffic from the UCS cards. Specifically, each drop bus provides 800 Mb/s data rate to six UCS cards, on average 133 Mb/s per UCS card, whereas the UCS cards can each send 200 Mb/s of cell traffic to the fabric over the other buses. However, this is only a problem when more than four UCS cards are connected to a drop bus, i.e. with four or fewer cards the drop data rate per card is 200 Mb/s or greater (800 Mb/s divided by the number of UCS cards). Therefore, a means of increasing the drop bus data rate when more than four UCS cards are installed is required, wherein the means does not require upgrades to the already installed UCS cards.

Problems With Prior Art Patents:
1. With respect to prior art patent 1. (U.S. Pat. No. 6,378,020), although the patent teaches using rising and falling edges of a clock to transmit data on a bus, the devices connected to the bus must be able to respond to both cycles defined by the rising and falling clock edges. Therefore, the patent does not provide an acceptable solution because it would require that already installed UCS cards (legacy cards) would need to be modified to be compatible with the solution, which makes it too costly.
2. The system of prior art patent 2. (U.S. Pat. No. 5,708,850) requires the coordination of identification codes assigned to devices connected to the bus. Hence, the solution would require modifications to existing UCS cards installed in the field and would therefore be unacceptable.
3. The system of U.S. Pat. No. 6,377,912 requires additional TDM mux and demux circuits as well as a crossbar to provide the TDM bus functionality. These additional circuits would require modifications to the installed UCS cards and is therefore unacceptable.
4. The problem with the bus scheme of prior art reference 4 (published U.S. patent Application 2002/0038397) is that devices coupled to the bus must be able to receive and respond to the sampling strobes. This capability would require modifying installed UCS cards, which makes the solution unacceptable for this application.

In general, the known prior art teaches techniques of increasing the data rate of a bus using TDM approaches that require modification of existing (legacy) devices connected to the bus, in order to make these devices compatible with the modified bus.

THE PRESENT INVENTION

The object of the present invention is to provide a system and method for increasing the data rate of a system bus without making modifications to existing (legacy) devices connected to the bus. According to the invention, a logical bus is overlaid onto one or more existing physical buses in a TDM manner. The overlaying is done by transmitting data into the one or more of the existing buses during a previously unused phase of the bus clock, thereby having no effect on existing devices connected to the buses. The additional devices that are capable of latching data on either phase of the bus clock are provided to interwork with the overlaid bus.

Thus, there is provided a method and apparatus of increasing the data rate of the bus of an electronic system having a bus clock with rising and falling edges and a first device coupled to the bus that is operable to latch data from the bus responsive to one edge of the bus clock comprising coupling to the bus, a bus driver that is operable to drive data onto the bus responsive to the other edge of the bus clock and coupling to the bus a second device operable to latch data from the bus responsive to the other edge of the bus clock. A further device operable to latch data from the bus that selectively responds to either edge of the bus clock may be provided. The invention contemplates configuring a third device to latch data from the bus responsive to a particular one of the two edges of the bus clock. Moreover, a further feature of the invention is that there are a plurality of devices of the same type as the first device, replacing one device of the plurality of the device of the same type as the second type device. The invention further features a bus driver operable to drive data onto a bus responsive to both edges of the bus clock and a further feature comprises decoupling from the bus an existing bus driver that is operable to drive data under the bus only in response to one edge of the bus clock.

DESCRIPTION OF THE DRAWINGS

The above and other objects, advantages and features of the invention will become more apparent when considered with the accompanying drawings wherein.

DETAILED DESCRIPTION OF THE INVENTION

According to the invention, in order to increase the data rate of a system bus without making modifications to existing devices connected to the bus, a new logical bus is overlaid onto one or more existing physical system buses. Data is driven onto the new logical bus on the clock edge that is opposite to the clock edge currently being used for the buses. That is, where the buses are driven from the rising edge of the system clock, the new overlaid logical bus is driven onto the buses on the falling edge of the system clock. Consequently, the logical bus is overlaid on the group of existing physical buses by interleaving the data of the logical bus in a TDM manner. In this way, slower legacy devices are still supported because they latch data on only one edge of the system clock, while new devices are supported because they can latch data on either edge of the clock. The new devices can be configured to latch data from the bus on the clock edge opposite to that of the legacy devices. Furthermore, since the logical bus is overlaid on all existing physical buses, a new device (e.g. linecard) can replace a legacy device at any location (e.g. card slot) in the system.

Figure 1:
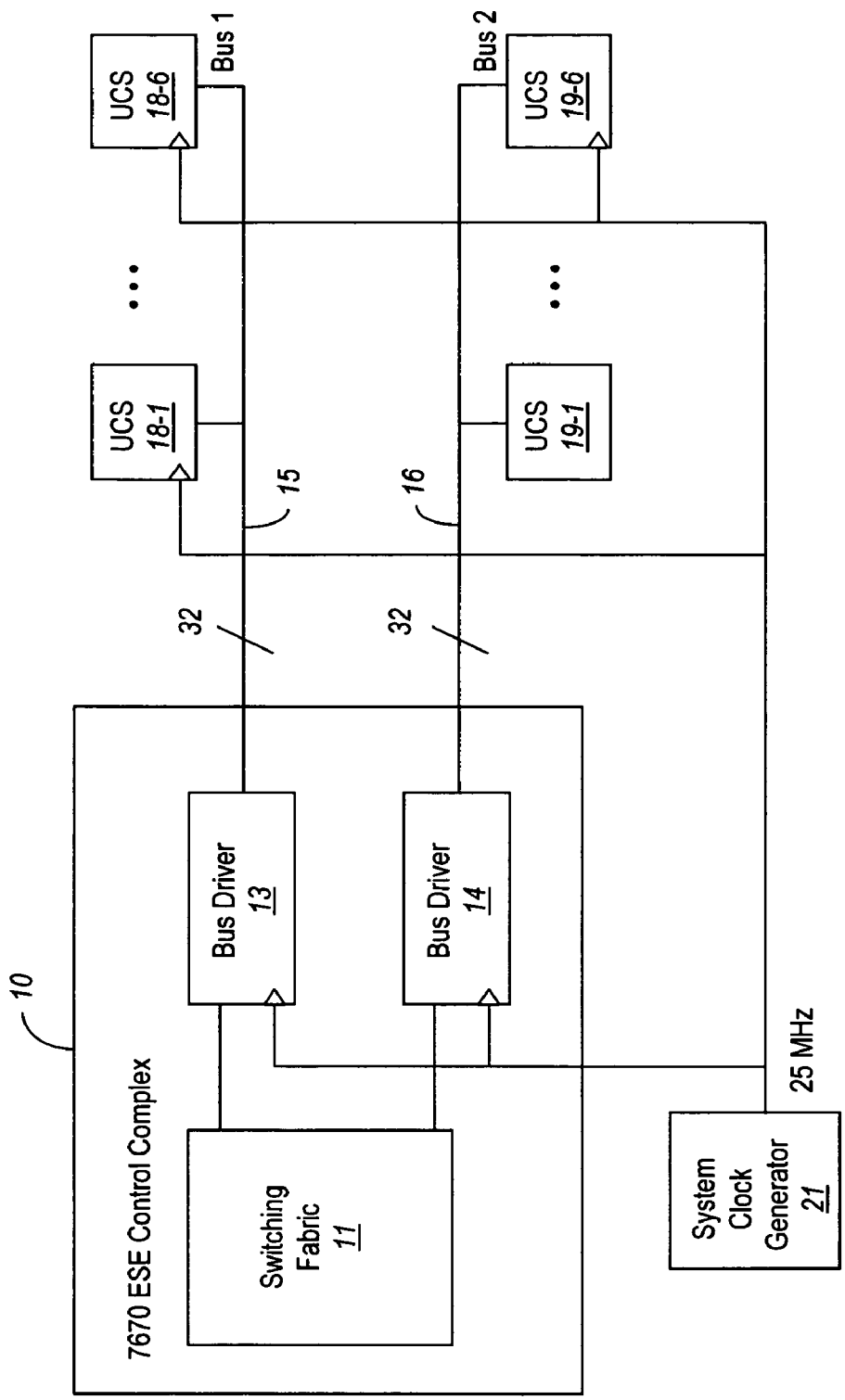
FIG. 1 is a block diagram of a prior art system bus architecture of the 7670 ESE.
Figure 2:
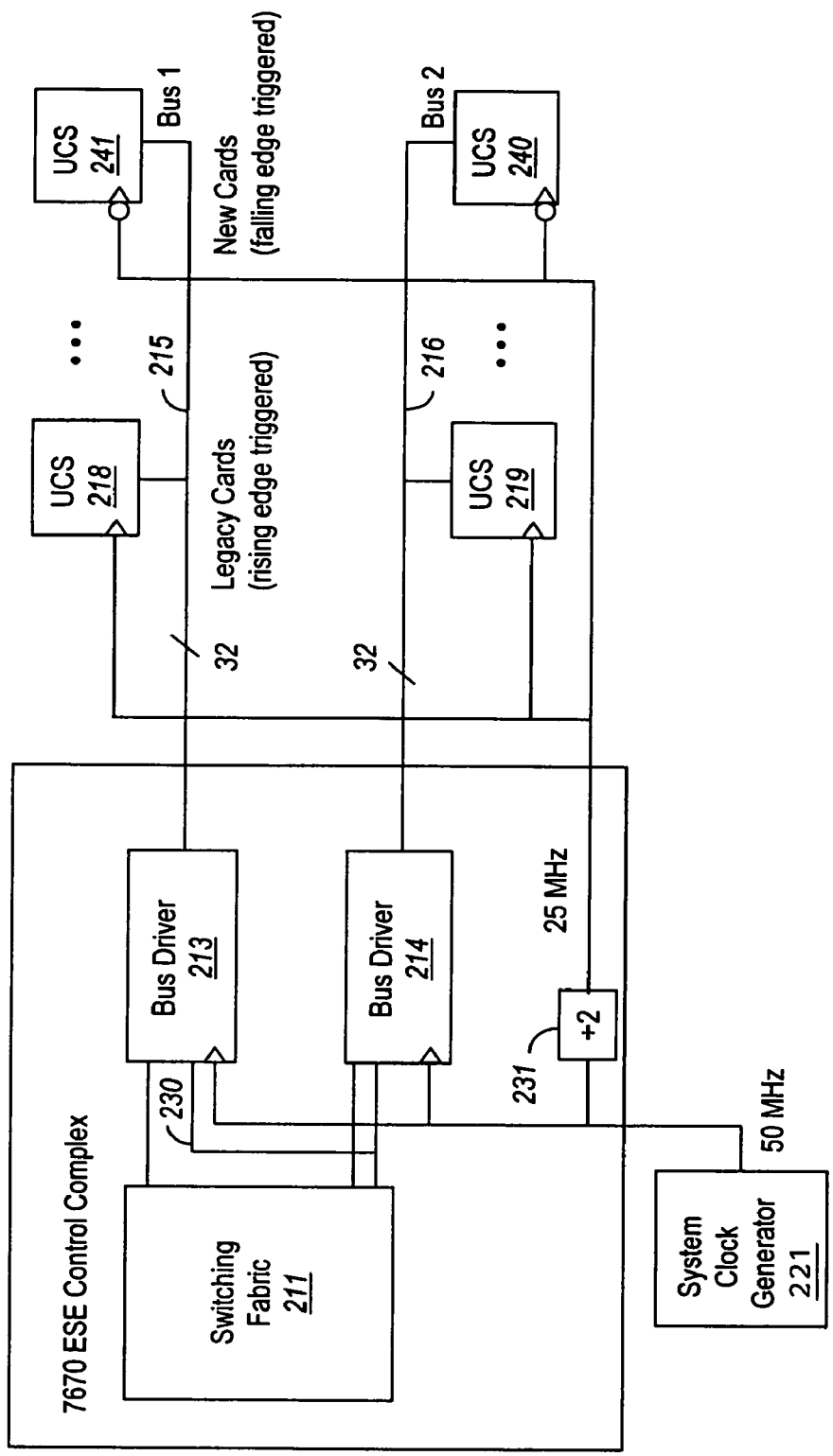
FIG. 2 is a block diagram of a bus system incorporating the invention with the new bus driver provided capable of driving the data on the rising and falling edges of the clock system.

FIG. 2 shows an embodiment of the invention in a practical embodiment. Referring to FIG. 2, bus drivers 213, 214 have been provided that are capable of driving data, on the rising and falling edges of the system clock, into both drop buses, bus 215 and bus 216. The bus drivers 213, 214 accept cell traffic from the switching fabric 211 over an additional connection 230 to the fabric and the original connections to the fabric. The bus drivers 213, 214 are clocked at 50 MHz by the system clock generator 221, and the clock is divided in half to 25 MHz by divider 231 for driving the drop bus. New UCS cards 240, 241 having the capability to latch data from the bus on either the falling or rising edge of the system clock, depending on how they are configured, are used to access the logically overlaid bus where required (e.g. as the fifth and sixth cards of a drop bus).

As noted earlier, the invention encompasses further UCS devices (linecards) which are configureable to latch data from the bus responsive to either edge of the bus clock, and/or configuring the UCS device to be able to latch data from the bus responsive to a particular one of the two edges of the bus clock. There may be a plurality of UCS devices of the same type as the first device replacing one of a plurality of the devices the same type as the second, third or fourth device. The bus drivers are operable to drive data into the bus responsive to both edges of the bus clock, and coupling further comprises decoupling, from the bus an existing bus driver that is operable to drive the data into the bus only in and in response to the one edge of the bus clock.

Advantages of the Invention Over the Closest Prior Art Solution:

1. Supports legacy cards—they can still latch data on whichever edge of the clock they used to latch it on.
2. Offers more flexibility—new cards, which have the ability to latch data on either clock edge, can be configured to use either clock edge, or both clock edges, as required.
3. Low risk—the bus clock signal, which can be very sensitive from a signal integrity point of view, does not change. That is, although the ECC bus drivers now use a 50 MHz clock, which is double the original rate, the clock is divided down to 25 MHz to provide the bus clock at the original rate.
4. The invention provides a low-risk, low cost, upgrade path to increase the throughput of a switch/router. Such upgrade options lower the total cost of ownership of a product over its product life, and this makes the product more competitive.

Thus, the invention provides a method and apparatus overlaying a logical bus onto one or more existing physical buses in a TDM manner. The overlaying is done by transmitting data into one or more of the existing buses on a previously unused phase of the bus clock, thereby having no effect on existing devices connected to the buses. Bus devices that are capable of latching data on either phase of the bus clock are provided to interwork with the overlaid bus. Thus, the system provides a method of upgrading a system bus to increase the data rate as well as an electronic system having an overlaid bus applied thereto.

While the invention has been described in relation to preferred embodiments of the invention, it will be appreciated that other embodiments, adaptations and modifications of the invention will be apparent to those skilled in the art.

What is claimed is:

1. A method of increasing data rate of an existing bus of an electronic system having a bus clock with rising and falling edges and a first device coupled to said bus that is operable to latch data from said bus responsive to one edge of said bus clock, comprising overlaying a logical bus on said existing bus by interleaving the data of the logical bus therewith, the steps of:

a) coupling to the existing bus, at least one bus driver that is operable to drive data onto the bus responsive to the other edge of the bus clock; and b) coupling to the bus, at least one second device that is operable to latch data from the bus responsive to said other edge of the bus clock.

2. The method of increasing the data rate of an existing bus of an existing electronic system as defined in claim 1 having a system clock and clock rate including the step of doubling the clock rate of said system clock.

3. The method of increasing the data rate of an existing bus of an electronic system as defined in claim 2 including the step of dividing said system clock by two to provide said bus clock.

4. The method defined in claim 1 of increasing the data rate of an existing bus including the step of providing a third device which is responsive to either edge of the bus clock and connecting said third device to said existing bus.

5. The method defined in claim 1 including providing a third device operable to latch data from the existing bus which is responsive to either edge of the bus clock and configuring said third device to latch data from said existing bus responsive to a particular one of the two edges of the existing bus clock.

6. The method defined in claim 1 wherein there are a plurality of devices as the same type as the first device, and replacing one or more device of the plurality with a device of the same type as said second type device.

7. The method defined in claim 1 wherein said bus driver is operable to drive data onto the existing bus responsive to both edges of the bus clock and wherein said step a) comprises decoupling, from said existing bus, an existing bus driver that is operable to drive data onto the existing bus only in response to the one edge of the bus clock.

\* \* \* \* \*